United States Patent

Olsson et al.

[11] Patent Number: 6,096,170
[45] Date of Patent: Aug. 1, 2000

[54] PRESSURIZED PEROXIDE BLEACHING VESSEL HAVING A ROTATABLE SCRAPER ARM AND CLEANING DEVICE

[75] Inventors: Hans Olsson; Yrjo Schildt, both of Karlstad, Sweden

[73] Assignee: Kvaerner Pulping Aktiebolag, Sweden

[21] Appl. No.: 08/860,190

[22] PCT Filed: Apr. 30, 1997

[86] PCT No.: PCT/SE97/00729

§ 371 Date: Dec. 22, 1997

§ 102(e) Date: Dec. 22, 1997

[87] PCT Pub. No.: WO98/49391

PCT Pub. Date: Nov. 5, 1998

[51] Int. Cl.⁷ .................................................. D21C 7/08
[52] U.S. Cl. ........................ 162/246; 422/226; 422/271
[58] Field of Search ............................. 162/43, 52, 246, 162/238, 272; 68/181 R; 422/224, 225, 226, 271

[56] References Cited

U.S. PATENT DOCUMENTS

| | | | |
|---|---|---|---|
| 3,554,864 | 1/1971 | Richter | 162/52 |
| 3,607,117 | 9/1971 | Shaw et al. | |
| 3,719,552 | 3/1973 | Farley et al. | |
| 3,804,304 | 4/1974 | Richter | 162/246 |
| 3,822,179 | 7/1974 | Chari et al. | |
| 4,085,002 | 4/1978 | Pettersson | 162/238 |
| 4,177,105 | 12/1979 | Laakso et al. | |
| 4,353,384 | 10/1982 | Gardner | |
| 4,496,099 | 1/1985 | Bull | |
| 4,581,104 | 4/1986 | Luthi | 162/43 |
| 4,748,004 | 5/1988 | Goodspeed | |
| 4,967,840 | 11/1990 | Miller | |
| 5,364,505 | 11/1994 | Funk et al. | |

FOREIGN PATENT DOCUMENTS

PCT/SE93/
00988 12/1994 WIPO.
WO96/17997 6/1996 WIPO.

OTHER PUBLICATIONS

*The Bleaching Of Pulp*, by R.P. Singh, Tappi Press, Third Edition, Revised; pp. 203, 657; undated.

Derwent's abstract, No. 63838 D/35, week 8135, Abstract of SU, 787–520 (Chipizubov M V), Dec. 18, 1980; 1 page.

Primary Examiner—Steven Alvo
Attorney, Agent, or Firm—Fasth Law Offices; Rolf Fasth

[57] ABSTRACT

A pressure vessel 1 with an output arrangement 5, primarily for use with pulp bleaching using peroxide at high temperature and high pressure, comprising a pressure vessel housing 1, a first end 2, as well as an output arrangement 3 at a second end, whereby the output arrangement 3 comprises an output scraper 4 with at least one scraper arm 5, as well as at least one cleaning member 6, a driving arrangement 7, a driving axle 8, a bearing 9, a supporting structure 10 for the driving arrangement 7, a normally open first outlet 11, as well as, preferably, a normally closed second outlet, whereby the first outlet 11 and the second outlet 12 are provided in the wall 1 of the pressure vessel.

12 Claims, 2 Drawing Sheets

PRESSURIZED PEROXIDE BLEACHING VESSEL HAVING A ROTATABLE SCRAPER ARM AND CLEANING DEVICE

This Application is a 371 of PCT/SE97/00729, filed Apr. 30, 1997.

The present invention relates to a method for pressurized bleaching of pulp and more specifically to a method for securely carrying out pressurized peroxide bleaching.

Our own patent SE-C-500 616 previously disclosed a method for carrying out pressurized peroxide bleaching of pulp with a consistency exceeding 8% in a bleaching vessel dimensioned for positive pressure, in which the pulp is fed to the vessel by means of a pump, is heated to a temperature exceeding 90° C., and is bleached with peroxide in an amount exceeding 5 kg/ADMT.

Oxygen gas is formed in conjunction with the decomposition of peroxide. If the output from the above-described bleaching vessel is suddenly stopped, the pressure in the reactor will successively increase as a result of the decomposition of peroxide and the formation of oxygen gas. The problem is not limited to peroxide, but rather of course also applies to other bleaching chemicals with this tendency toward "post-fermentation" at high temperature, such as, for example, chlorine dioxide.

In our own patent application SE-9404299-1 is shown a security system that eliminates the risk that the above-mentioned impermissible pressure limit is reached within the vessel or any part of its peripheral equipment. Among other things is shown that the output scraper, which is arranged in the top of the reactor and cleans in front of the outlet valve as well as the emergency valve, so that plugging up of the pulp in and in front of these valves is eliminated.

The upper part of the reactor as shown in the above-mentioned application, with an output scraper and valves, works well but is relatively expensive to manufacture. According to the known principle, the output valve and the emergency valve are provided on a separate unit, normally a pipe, above and on the reactor housing itself. A result of this construction is that the length of the axle of the output scraper, which is driven by a motor that sits arranged farthest at the top, becomes relatively long, which leads to problems both of dimensioning and in the bearings. Furthermore, the amount of material used is relatively large.

The object of the present invention is to provide a construction that solves the above-mentioned problems yet still offers the same advantages when it comes to security.

The object is achieved with a pressure vessel having an output scraper for use with pulp bleaching primarily using peroxide, at high temperature and high pressure, comprising a pressure vessel housing with a first end, and an output arrangement at a second end, whereby the output arrangement comprises an output scraper with at least one scraper arm as well as at least one cleaning member, a driving arrangement, a driving axle, a bearing, a supporting structure for the driving arrangement, and at least one normally opened outlet, as well as, preferably, a second normally closed outlet arrangement, whereby the said normally opened outlet is arranged in the wall of the pressure vessel at the curved gable at the second end.

BRIEF DESCRIPTION OF THE DRAWINGS

The invention will be explained as follows in greater detail with reference to the attached figures in which.

DETAILED DESCRIPTION

Figure 1:
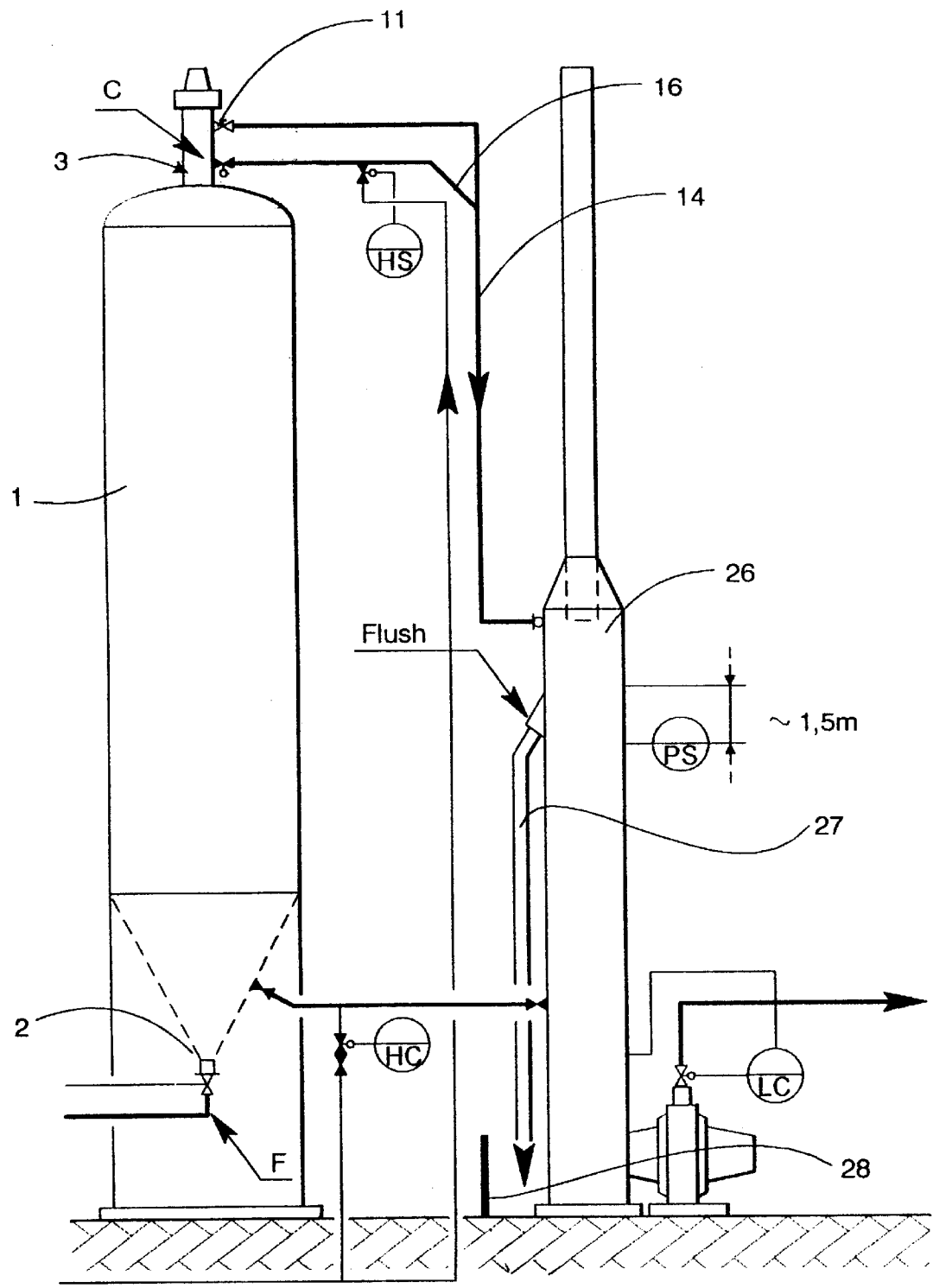
FIG. 1 shows a known embodiment for providing a security system in conjunction with a pressurized peroxide bleaching vessel.

A known pressurized peroxide bleaching vessel is shown in FIG. 1. The vessel comprises a housing 1 with an input arrangement 2 provided at its lower end, as well as an output arrangement 3 arranged at its upper end. The pulp is output normally with the aid of an output scraper through a first outlet opening 11 that is connected with a first outlet conduit 14. The pulp is led via the outlet conduit 14 to a so-called standpipe 26, where gas is removed from the pulp. The standpipe 26 is further provided with a spillway 27 that opens into a region that is at least partially surrounded by a wall 28 that is impermeable to fluids.

Figure 2:
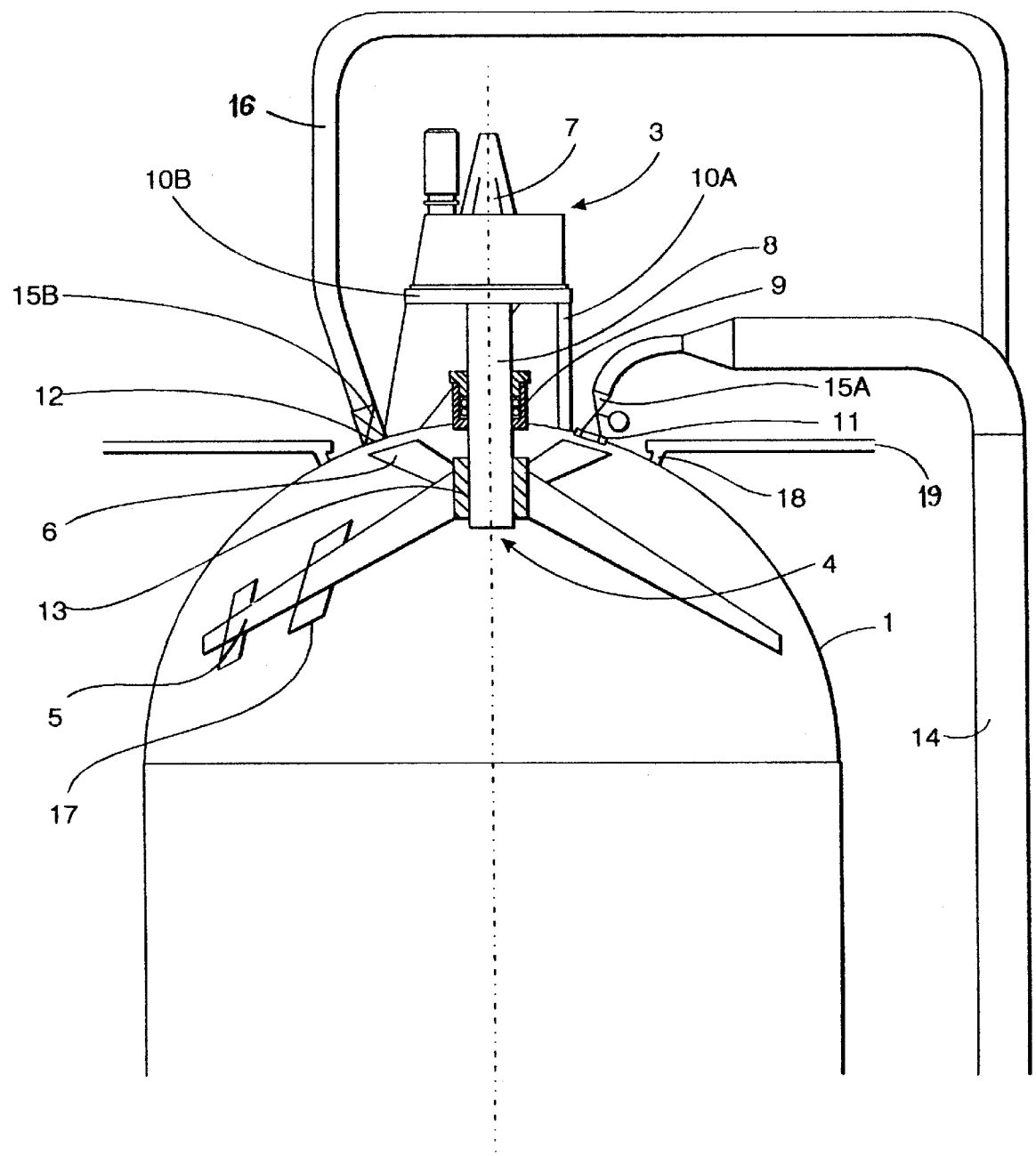
FIG. 2 shows a preferred detailed solution according to the invention of the output end of such a vessel.

The upper end of a reactor vessel is shown in FIG. 2 with a preferred output arrangement 3 according to the invention. The reactor vessel has a diameter exceeding 2.5 meters. A scraper 4 is arranged to rotate within the vessel 1. The scraper 4 consists of two scraper arms 5 that are arranged using known scraper blades 17 or the like. The scraper arms 5 are securely mounted in a cylindrical sleeve 13, which is mounted at the end of a driving axle 8. The driving axle has a length that is less than 3 meters. Preferably, the length is less than 2.5 meters. Cleaning members 6 are also secured to the cylindrical sleeve 13 (or, alternatively, directly on the scraper blades). The axle 8 is mounted in bearings in a stuffing box unit 9 whose bearings are fixed in the wall 1 of the vessel. The axle 8 is rotated with the aid of a driving unit 7, which is arranged at the other end of the axle with the aid of a supporting structure 10, which is securely welded to the vessel wall 1. According to a preferred embodiment, the supporting structure 10 comprises a member 10A, which has a U-shaped cross-section and is securely welded to the vessel wall 1, and a mounting plate 10B for the driving arrangement 7. A platform 19 is anchored in the vessel wall 1 using, for example, suitable spacers 18. A first outlet opening is arranged between the lower mount 18 of the platform 19 and the stuffing box 9. The outlet opening 11 is provided in an annular plate that is securely welded to the reactor wall 1. This outlet opening 11 opens via a normally open valve 15A within the outlet conduit 14. In order to eliminate the risk of plugging, the valve 15A is arranged directly against the annular plate. In order to always keep the outlet opening 11 free from any possible pulp plugs, the cleaning member 6 is provided to scrape clean very close to the opening.

In order to ensure secure operation even when the first part of the outlet conduit 14 is plugged up, there is provided a second outlet conduit 16 that opens into the outlet conduit 14 at a point between the inlet to the standpipe 26 and the said output opening 11. A second outlet opening 12, which is also provided in direct connection with the vessel wall 1, is equipped with a normally closed valve 15B, which opens within the outlet conduit 16. The said second outlet opening 12 is also arranged in such a way that the cleaning member 16 eliminates the risk that a pulp plug will arise at this opening.

In what follows, the function of the arrangement will be described briefly.

The pulp is fed according to a preferred embodiment using an MC-pump to the bleaching vessel 1. The pressure within the vessel is maintained with the aid of said MC-pump. Between the pump and the bleaching vessel there is normally a mixer, which is fed with steam in order to raise the pulp temperature. If the vessel is used for high-temperature peroxide bleaching, then the peroxide is normally added in or before the MC-pump, but it can also be added to advantage at the input end 2, whereby additional negative catalyzing metal contact is avoided. The pulp moves upward within the vessel 1 as a plug flow. When it reaches the output scraper 4, which rotates, the pulp is fed out through the outlet opening 11 into the outlet conduit 14 and thereafter onward to the standpipe 26. If the pressure in the reactor exceeds a certain set-point limit, then there is a control system that opens the security valve 15 so that pulp can be fed out using the by-pass conduit 16 to the standpipe 26.

Many advantages are achieved with the help of the invention. First, the construction leads to a very cost-effective solution. Compared to the prior art, a significantly shorter axle to the scraper is achieved, which leads to direct savings of material, as well as to simplified bearings. Thanks to the new construction, one can additionally provide the supporting structure for the driving arrangement with direct openings, which means that one can easily maintain the stuffing box. The amount of welding in the pressure vessel is, furthermore, minimized since only the two relatively small plates to the outlet openings 11 and 12, as well as the bearing, need to be welded to the vessel as compared with the large circumferential welds (normally approximately 3 meters both where the neck is secured to the pressure vessel and at the upper end of the neck), which are necessary if a large "neck" is used as in the known embodiment. In summary, the invention thus leads to a significantly less expensive solution than the prior art and is additionally easier to maintain.

The invention is not limited to the preferred embodiment shown above but may be varied within the scope of the patent claims so that, for example, instead of an upward-feeding tower, a downward-feeding tower can be used. The invention can of course be applied in connection with all types of "post-fermenting chemicals." Moreover, the invention can also be used to advantage with reactors that are intended for "non-post-fermenting chemicals," such as, for example, oxygen gas, whereby no additional security outlet need be provided.

While the present invention has been described in accordance with preferred compositions and embodiments, it is to be understood that certain substitutions and alterations may be made thereto without departing from the spirit and scope of the following claims.

What is claimed is:

1. A pressure vessel with an output arrangement for use with pulp bleaching using peroxide at high temperature and high pressure, comprising:
   a pressure vessel housing having a first upper end and a second lower end;
   an output arrangement disposed at the first upper end of the pressure vessel, the output arrangement comprising:
   at least one scraper arm;
   at least one cleaning device;
   a driving axle in operative engagement with the scraper arm;
   a driving arrangement attached to the driving axle, the driving arrangement in operative engagement with the cleaning device so that both the scraper arm and the cleaning device are rotatable with the same driving axle;
   a bearing rotatably attached to the driving axle;
   a supporting structure for supporting the driving arrangement;
   at least one normally opened first outlet opening defined in an outer wall of a curved gable of the pressure vessel at the first upper end thereof;
   a normally closed second outlet opening defined in the curved gable;
   the second outlet opening having a center and the first outlet opening having a center, the center of the first outlet opening being disposed a first distance from a center of the driving axle and the center of the second outlet opening being disposed a second distance from the center of the driving axle, the first distance being approximately the same as the second distance so that the cleaning device is being permitted to clean both the first and second outlet openings when the cleaning device is rotated, the scraper arm extending downwardly and away from the first and second outlet openings.

2. The pressure vessel according to claim 1 wherein the bearing is arranged in direct connection with the wall of the pressure vessel housing and the bearing comprises a stuffing box.

3. The pressure vessel according to claim 1 wherein the driving axle has a length that is less than three meters.

4. The pressure vessel according to claim 3 wherein the length is less than 2.5 meters.

5. The pressure vessel according to claim 1 wherein the arrangement comprises a unit and both the cleaning device and the scraper arms are secured to the same unit.

6. The pressure vessel according to claim 5 wherein the cleaning device is secured directly to the scraper arms.

7. The pressure vessel according to claim 1 wherein the first outlet opening is defined directly in a wall of the pressure vessel housing.

8. The pressure vessel according to claim 1 wherein the second outlet opening comprises a normally closed security valve that has an outlet opening defined therein that is in fluid communication with a second outlet conduit.

9. The pressure vessel according to claim 1 wherein the second outlet opening is defined directly in a wall of the pressure vessel housing.

10. The pressure vessel according to claim 9 wherein the second outlet opening is defined in a curved gable of the first upper end of the pressure vessel housing.

11. The pressure vessel according to claim 1 wherein an opening is defined in the supporting structure to permit maintenance of the bearing.

12. The pressure vessel according to claim 1 wherein the pressure vessel housing has a diameter exceeding 2.5 meters.

* * * * *